Figure 1:
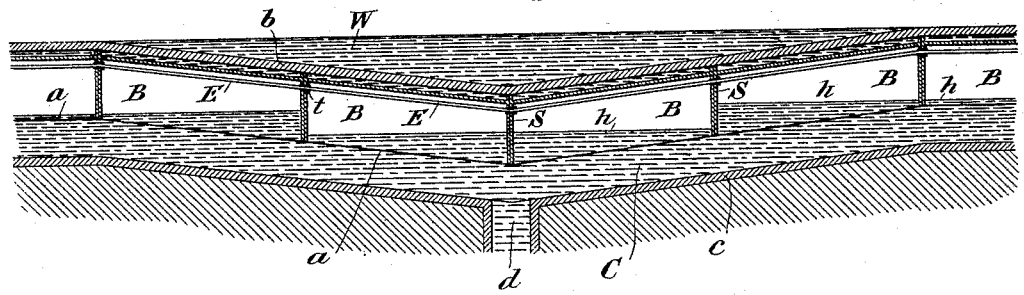

(No Model.)  6 Sheets—Sheet 1.
R. W. BARKLEY.
ELECTRIC RAILWAY.

No. 476,776. Patented June 14, 1892.

Witnesses
C. E. Ashley
H. W. Lloyd.

Inventor
Richard W. Barkley.

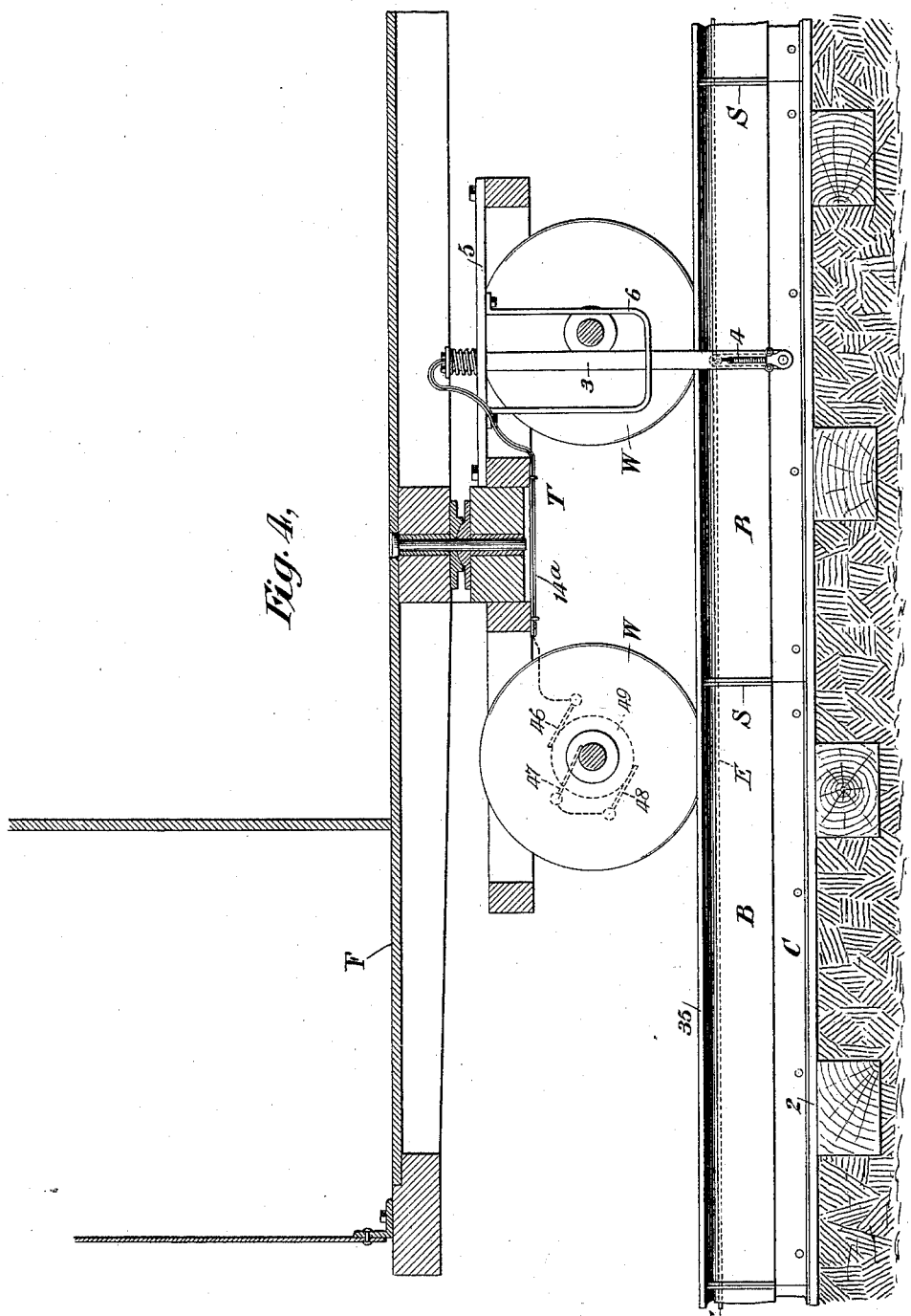

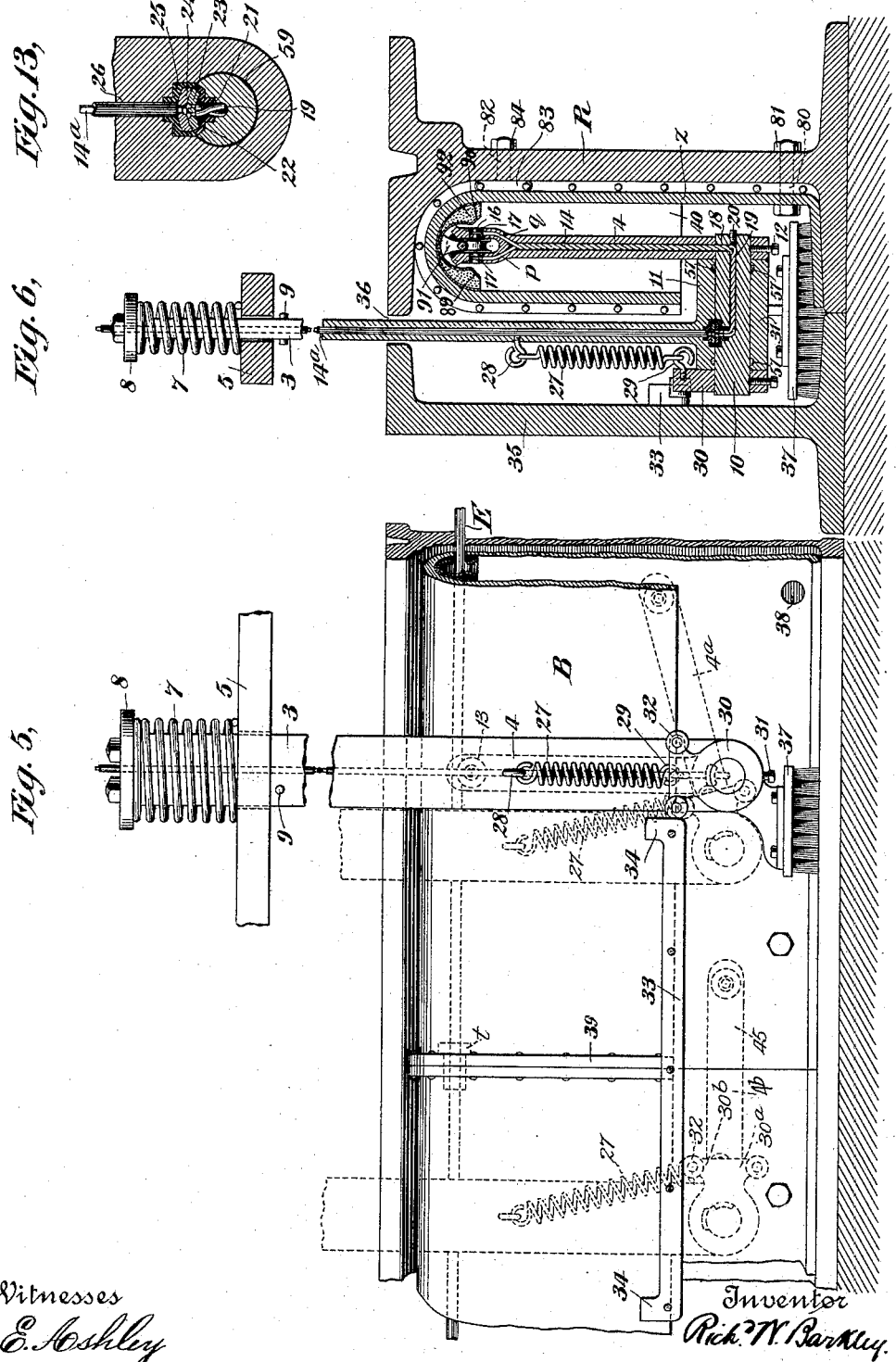

(No Model.) 6 Sheets—Sheet 4.
R. W. BARKLEY.
ELECTRIC RAILWAY.
No. 476,776. Patented June 14, 1892.
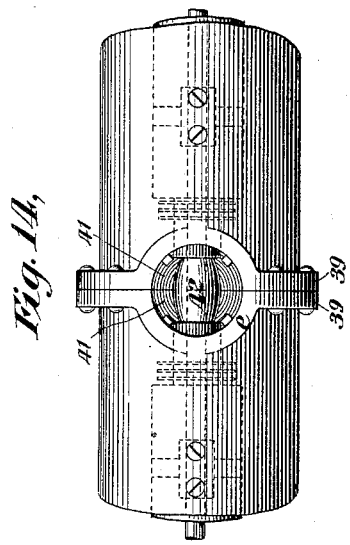
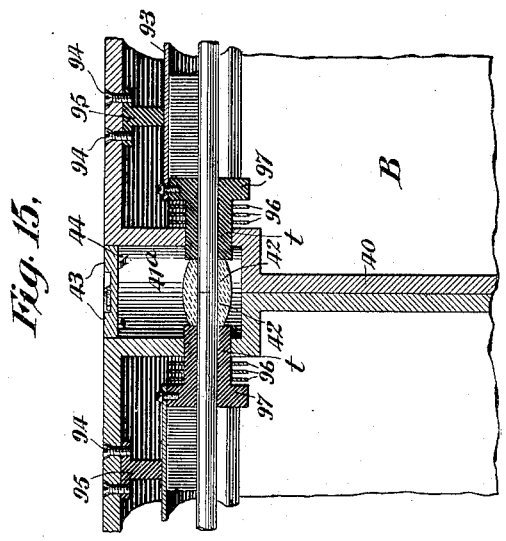
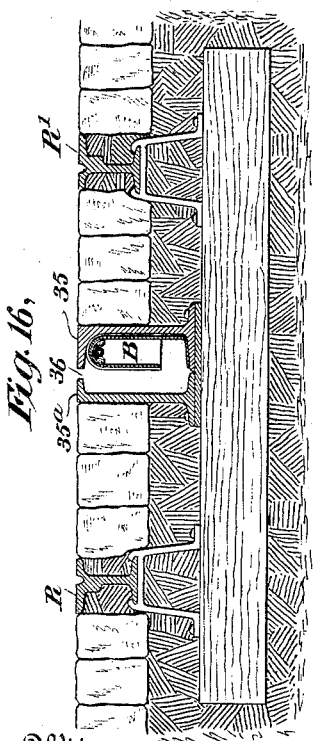
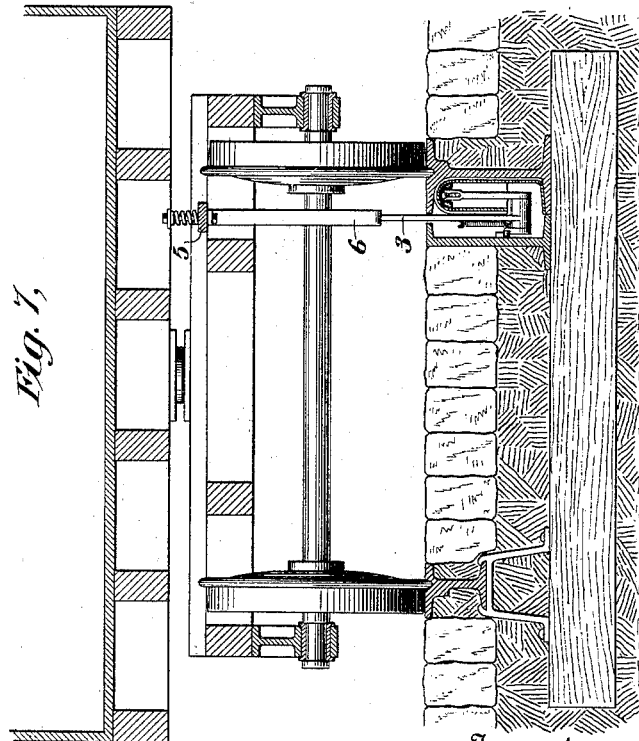
Witnesses
C. E. Ashley
I. W. Lloyd
Inventor
Richard W. Barkley.

(No Model.) 6 Sheets—Sheet 5.
R. W. BARKLEY.
ELECTRIC RAILWAY.
No. 476,776. Patented June 14, 1892.
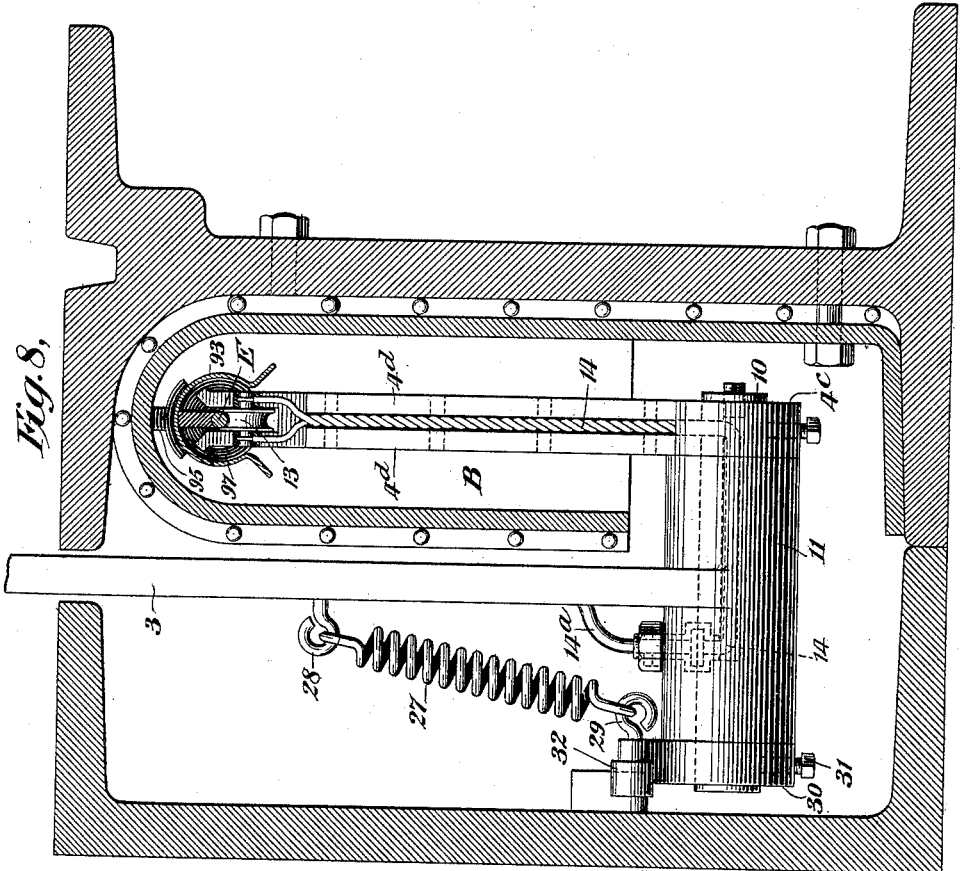
Witnesses
C. E. Ashley
H. W. Lloyd
Inventor
Richard W. Barkley (No Model.)  6 Sheets—Sheet 6.

R. W. BARKLEY.
ELECTRIC RAILWAY.

No. 476,776. Patented June 14, 1892.

Witnesses
C. E. Ashley
H. W. Lloyd

Inventor
Richard W. Barkley

THE NORRIS PETERS CO., PHOTO-LITHO., WASHINGTON, D. C.

UNITED STATES PATENT OFFICE.

RICHARD W. BARKLEY, OF BROOKLYN, NEW YORK.

ELECTRIC RAILWAY.

SPECIFICATION forming part of Letters Patent No. 476,776, dated June 14, 1892.

Application filed March 12, 1892. Serial No. 424,724. (No model.)

*To all whom it may concern:*

Be it known that I, RICHARD W. BARKLEY, a citizen of the United States, and a resident of the city of Brooklyn, in the county of Kings and State of New York, have invented certain new and useful Improvements in Electric Railways, of which the following is a specification.

My invention relates to electric railways having an underground electric conductor which is exposed to the air at all times, and with which electro-motors on the railway may have connection for purposes of propulsion.

Heretofore in electric railways having underground conductors no practicable method or means for preventing grounding through the filling or flooding of the conduit with water, mud, slush, &c., has been found. In the *Street Railway Journal* for November, 1891, will be found brief descriptions of the several methods and means theretofore publicly known for propelling railway-cars by electrical energy derived from underground conductors and of the objections to all these methods. In the invention hereinafter described the electric conductor is passed through a series of air-tight open-bottomed vessels, the conductor passing through the walls of the same in suitable air-tight packings, which are or may be of insulating material. These vessels or diving-bells may be of any suitable material, as metal, compressed wood pulp, &c. The conductor may be supported at other points than where it passes through the walls of the diving-bells by suitable means, preferably of insulating material. In said diving-bells the conductor is separated from the top and sides by an air-space, thus securing air-insulation for the same. It is necessary to have an electric connection from the main conductor to the electro motor or motors, and the said connection must be capable of passing the septums or walls separating the diving-bells. To avoid sparking and to be able to start the car at all times, a plurality of said connections or contact-carriers are placed on each vehicle, said carriers being placed at such distances apart that all of them cannot be caught at one time under the walls separating the diving-bells and so have all the contact-pieces out of contact with the main conductor in the diving-bells. This distance apart is dependent upon the number of carriers on each vehicle and on the length of the shorter diving-bells. The length of any particular diving-bell is dependent upon two factors—the gradient of the road and the depth of the walls of the diving-bell below the conductor therein. Any increase or decrease of the first, the second remaining constant, leads to a shortening or lengthening of the diving-bell, (or permits of the last,) as the case may be, while if the first remains constant and the second be increased or decreased the diving-bell may be increased or diminished in length and must be shortened after a certain point is reached in the decrease of the second factor. On a level the diving-bell may be equal in length to the level or may have any shorter length, as desired.

My invention consists of devices and combinations of devices hereinafter described, and is more particularly and broadly pointed out in the claims.

One part of my invention consists of a contact-carrier arm capable of reciprocating motion relatively to the conductor in the diving-bells, whereby the contact may be depressed below the same and returned to contact position. I prefer that this reciprocating motion shall be of the oscillating or swinging kind, as it is easier of attainment, requires a shallower conduit than a rectilinear motion, and possesses other advantages. The diving-bells may be separate from each other, in which case they may each have a section of the conductor secured therein in the shops and may be completely finished ready to be joined together and to be secured in place in the railway. When in place therein, the adjoining ends of the sections of the conductor may be connected and insulated in any suitable way. Of course the conductor is insulated from the diving-bell if the latter is not itself of insulating material. The conductor may be supported from the diving-bells in ways usual in underground conduits, as well as by the ends of the bells where it passes through them. Again, the diving-bells may be made by placing air-tight partitions in a long bifurcated air-tight trough having the opening downward. A sheet-metal inverted-U-shaped trough with said partitions placed therein may be used. One or two or more diving-bells in one piece may be used. The material of which the diving-bells are made is not essential. They may be made of metal, fiber, as wood pulp, plastic material molded to shape and hardened, whether it be insulating or non-insulating, or other material. The diving-bells are preferably placed in a conduit, in order that they may have no duty other than the protection of the conductor from contact with the water, &c. This conduit may be placed in any desired position relatively to the rails, inside or out. One of the rails may have a deep web and form one wall of the conduit, the other being formed by a Z or three-quarter I bar or beam. In the last case the diving-bells are preferably placed under the top flange of the said Z or three-quarter I-beam, and this beam is preferably outside of the rail. The top flanges of the rail and beam form the walls of the slot in this case. The conduit itself may be of any desired construction and material. Two Z or other shaped beams may be used to form the conduit.

Forms of my invention are shown in the accompanying drawings, forming part of this specification, in which—

Figure 2:
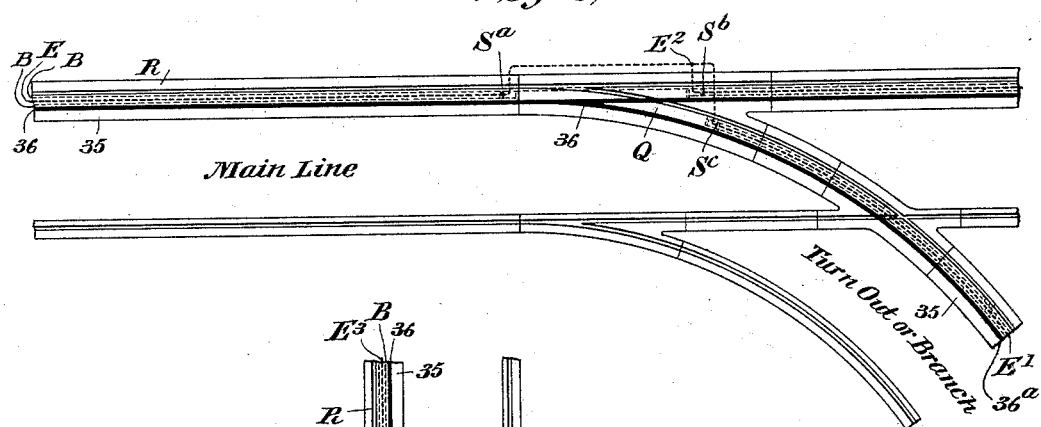
Figure 3:
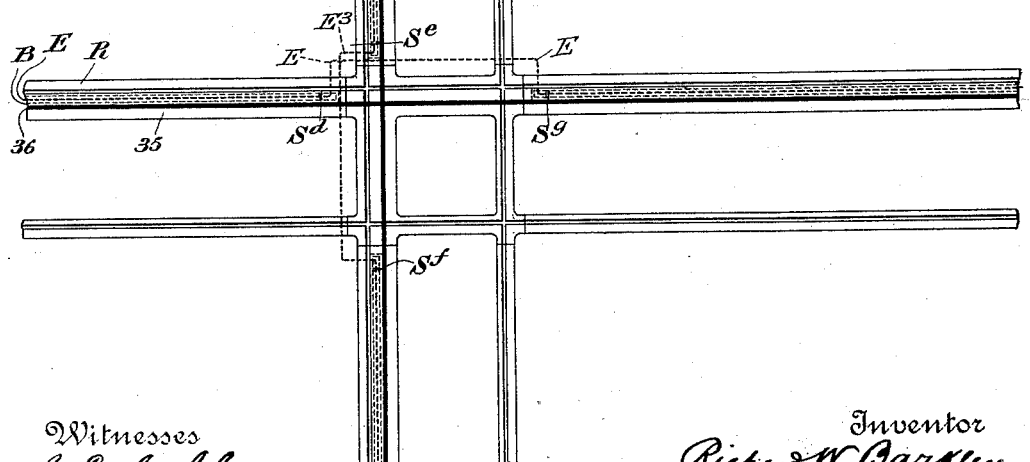
Figure 17:
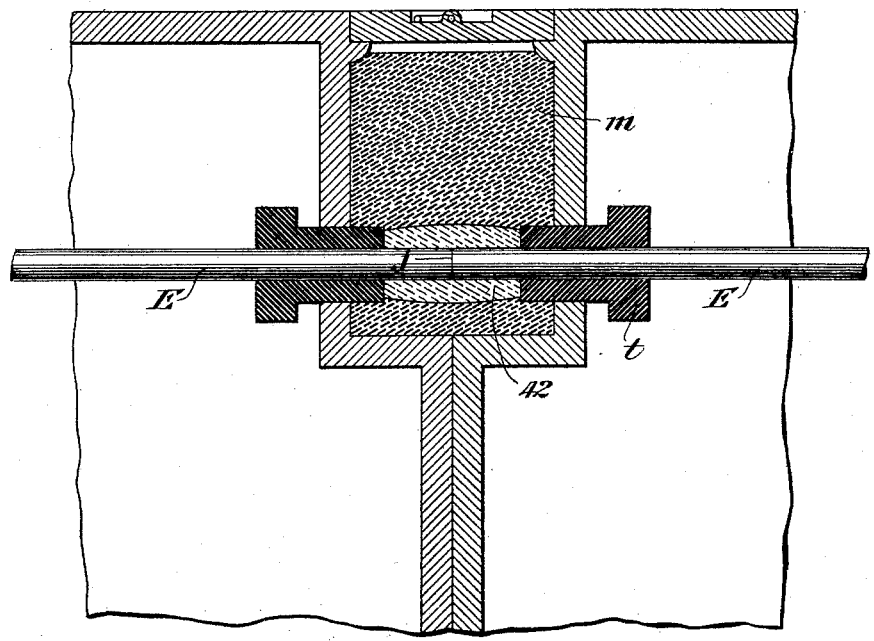
Figure 18:
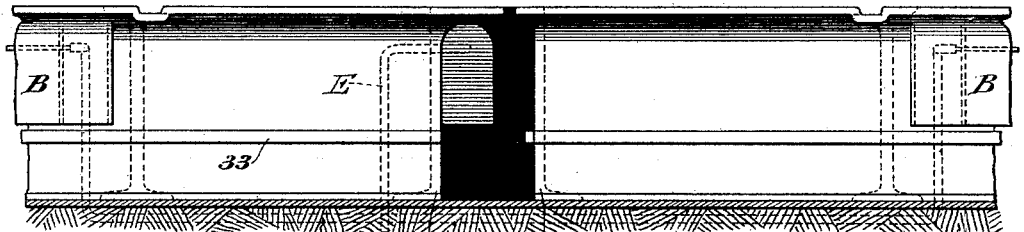

Figure 1 is a sectional side elevation of the diving-bells and conduit, showing the same flooded with water. Fig. 2 is a plan view of a turn-out. Fig. 3 is a plan view of a crossing. Fig. 4 is a sectional side elevation of a part of a car, the diving-bells, and connections to the conductor from the car. Fig. 5 is an enlarged detailed view of some of the parts shown in Fig. 4 and the operation thereof. Fig. 6 is a cross-section of the part shown in Fig. 5. Fig. 7 is an elevation of the parts shown in Fig. 5. Fig. 8 is an elevation partly in section, showing a diving-bell, the conduit, the carrier, (part thereof removed,) and part of a support. Figs. 9, 10, 11, and 12 are detailed views of part of the carrier. Fig. 13 shows one form of the connection between the two parts of the conductor leading to the motor. Figs. 14 and 15 are detail views of the preferred method of connecting the diving-bells together. Fig. 16 is a cross-section view showing a preferred form of the railway. Fig. 17 is a sectional view of the ends of two adjoining diving-bells. Fig. 18 is a sectional elevation along a conduit at a crossing, showing the extended depressors thereat. Fig. 1 shows the parts somewhat exaggerated for the purpose of more clearly indicating the action of the diving-bells in protecting the wire from contact with water and in securing an air insulation thereof.

The diving-bells, as B B, are shown in section with their lower edge (on one or both sides) on the line $a$ and their tops under the part $b$ of conduit C. The ends of the bells abut against each other and form the septums S S and are secured together by bolts or rivets passing through flanges thereon. The diving-bells are shown as being on grades the lower ends of which meet. The bottom $c$ of the conduit has a drain $d$ opening through it at the lowest point into the conduit. A bare conductor, as wire E, passes through the diving-bells and the septums near the tops thereof. Thimbles $t$ are shown supporting the conductor where it passes through the septums. Said thimbles must be of insulating material if the diving-bells be of non-insulating material and must make an air-tight joint with the septums and the conductor.

The broken lines W indicate water filling the conduit and rising some distance above the surface of the road. The horizontal lines $h\,h$ in the diving-bells represent the surfaces of the water therein, the heights thereof above the bottom of the septums being somewhat exaggerated. It will be noted that there is considerable space at the lower end of each diving-bell on the grades between the surface of the water and the conductor, while at the upper end of each of said diving-bells and at the ends of those diving-bells on the level the distance between the surface of the water and the conductor is practically equal to the depth of the septums below the same. The diving-bells may be coated with a paint or a non-drying oil. Such coating will prevent the deposition of moisture thereon in a measure. Where the diving-bells are of fibrous material, to prevent any capillary action thereof the same may be impregnated or coated with a non-drying oil or paint.

Passing now to Figs. 4, 5, 6, 7, and 13, the diving-bells are indicated by the references B, the septums by S, and the conduits by C, as before, while 35 marks a beam, (shown as a three-quarter I-beam,) under the top flange of which the diving-bells may be placed, it being understood that any flange under which they are placed should be of width and strength sufficient to fully protect them from all strains due to traffic or other cause.

The partly-shown car is marked F, a truck supporting the car at one end is marked T, and two of the wheels of the truck are each marked W.

Depending from and suitably supported by the car-body, or preferably the truck, is a support, as 3, for the contact-carrier. Support 3 passes loosely through a perforation in bar 5 of the truck and a similar hole in bar 6, supported by the truck or by bar 5. The support 3 above the bar 5 has a collar or shoulder 8 and is surrounded by a spring 7, which is under compression and bears against said bar 5 and shoulder 8. The upward movement of support 3 is preferably limited by a pin 9, passing therethrough below one of said bars, as bar 5, rather than by its contact with the edge of the diving-bells. The function of spring 7 is to keep the contact-piece on the carrier up against the conductor when the carrier is in normal position.

The contact-carrier is pivotally connected to the support 3, and is thus made capable of having an oscilating motion. I may fit the support with a hollow bearing 11 and have said carrier composed of an arm, as 4, and a shaft, as 10, closely fitting and journaled in said bearing 11. Arm 4 and shaft 10 may be integral with each other, or they may be separate and be secured together in any suitable way, as by a pin or screw 12, passing through a circular or polygonal eye of the arm 4 into or against the shaft 10. When integral, the carrier may be molded into form and hardened, the conductor 14 being placed in the interior of such plastic material and held therein in place. After the molding and hardening processes the carrier is tooled to shape and fitted with the contact-pieces and insulation, as hereinafter described, or these may be placed therein with conductor 14. Wood pulp may be used for the carrier, the same being subjected to great pressure during the process of making, whereby a strong tough article may be secured. The said wood pulp may be impregnated or coated with a non-drying oil. When shaft 10 and arm 4 are not integral, the arm 4 is bored or formed with an eye at one end to accurately fit the shaft 10, and at its other end is fitted with any suitable contact-piece, as a wheel 13. Said wheel 13 must be wholly insulated from arm 4 at its sides, and its shaft 16 must be insulated from arm 4 when the latter is not of insulating material. (See bushings 17 17.) Said carrier supports a part of the conductor for connecting the wheel 13 with the motor. I prefer that said part of the conductor shall be inside the said carrier, and for this purpose have shown the said carrier as being hollow the requisite distance. The arm 4 may be constructed in any suitable way to permit of the assembling of it, the shaft 10, and conductor 14 to form one piece. One method of so constructing it is shown in Figs. 8 to 12, inclusive, Fig. 12 being taken on line 12 12, and Fig. 10 being a central longitudinal sectional view of the arm 4 with the piece $4^b$ removed. The arm 4 is shown as made of two pieces or parts $4^a$ $4^b$. The part $4^a$ has an eye $4^c$ at one end and is U-shaped in cross-section. (See Fig. 12.) The groove $4^d$ of part $4^a$ intersects the bore of eye $4^c$ and extends to the fork at the other end of the arm. Near the fork are the shoulders $4^e$, which extend inward from the face, having groove $4^d$ about half-way, the arm $4^a$ extending beyond the shoulders, as in Fig. 10. Piece $4^b$ fits the groove, but does not extend to the bottom thereof, so that there is a space left for the conductor 14. This piece has shoulders $4^f$ at each side, which fit on shoulders $4^e$ when the parts are assembled. The piece $4^b$ forks near its upper end, and when the piece is in place these forks lie close against the forks of piece $4^a$. The pieces $4^a$ $4^b$ are held together by bolts and nuts or the rivets $x$, which pass through suitable holes in said parts. The shaft 10 is centrally bored, as at 19, to where the conductor is to turn radially to connect with the other part thereof carried by support 3, at which point a cross-bore 21 intersects central bore 19. A cross-bore 18 in shaft 10 connects bore 19 with the end of the bottom part of the groove $4^d$ in piece $4^a$. Bore 21 is reamed out or countersunk for the purpose of receiving an insulating-bushing 22. The conductor leading from the wheel 13 to the motor is in two parts, the part 14 thereof, carried by the contact-carrier, preferably being in the groove $4^d$ and the bores 18 19 21. Said part 14 is shown as composed of two insulated wires twisted together, one end of one of said wires following groove $p$, one end of the other following groove $q$, while the other ends of said wires are secured to a cylindrically-curved plate 23, fitting in the flaring rim of bushing 22. After the conductor 14 is in place bore 19 may be filled with suitable insulating material, and, if desired, a plug, as screw 20, may be inserted therein to more effectually render it air and water tight. If the carrier is of insulating material, the insulation on conductor 14 may be omitted. The other part $14^a$ of said conductor is supported in any suitable way as it passes to the motor. In Fig. 6 the support 3 is shown as having a bore 26 and as having said conductor $14^a$ inside thereof. The conductor $14^a$ is shown in Fig. 4 as being supported on the truck after leaving support 3 and before it reaches the motor. The conductor $14^a$ is secured at its lower end to a contact 24, curved to fit contact 23, with which it is normally in contact. Said contact 24 is insulated from support 3 or the bearing 11 by a bushing 25, of insulating material, placed in a countersink on the upper face of the hollow of bearing 11.

The method of assembling the shaft 10, arm 4, and conductor shown in the drawings is as follows: The piece $4^a$ is slipped over the shaft 10 and secured in place. (See Fig. 10.) The ends of the wires forming conductor 14 are stripped of insulation, inserted in holes through the walls of the bushings 17 17, and curved around the interior of the same in a shallow groove. The bushings may now be placed over the axle 16 of the trolley-wheel 13. The other end of the wires of conductor 14 may now be inserted in hole 18 in shaft 10 and be forced or pulled along bore 19 and out of the bore 21. As soon as the wires 14 are in the bottom of the groove $4^d$ the piece $4^b$ may be put in place, the bushings 17 17 fitting into the semi-cylindrical bearings $17^a$ $17^b$ in the pieces $4^a$ $4^b$, and the parts be bolted or riveted together. The parts may be heated and groove $4^d$ be filled with melted paraffine before the piece $4^b$ is secured in place. The conductor 14 should be drawn tightly through the shaft 10, cut off, stripped of its insulation near the ends of the wires, the bushing 22 be placed in position, and the ends of the wires be secured to the contact-piece 23. The arm 4 is held upright, or as nearly so as working conditions will permit, with its contact-piece in contact with the conductor E by any suitable means, as a spring. The shaft 10 is shown as extending at each and beyond the bearing 11.

It is fitted with arm 4 at one end (that under the diving-bells) and at the other end with a sleeve or eye 30. Sleeve 30 has one or more arms, as 30ª 30ᵇ, on each of which may be a roller 32. Sleeve 30 is secured to shaft 10 by a pin or set-screw 31. Said sleeve 30 is provided with an eye or hook 29, and said support 3 with a similar eye 28. A spring 27, fast at its ends to said eyes and under tension at all times, keeps the arm 4 in its normal or upper position, except at the times the same is depressed, as will hereinafter appear. Eye 29 and the axes of shaft 10 and arm 4 are in one plane, and eye 28 is placed centrally of the support 3, so that when the eyes 28 29 are their minimum distance apart the arm 4 is upright.

For the purpose of passing the septums S with the arm 4 and its contact-piece I prefer that the means for depressing the arm shall be placed elsewhere than on the diving-bells. For the purpose of depressing the arm 4 I use the eye or sleeve 30, above described, and its attachments and a fixed depressor adjacent each septum for coaction with said arm or the rollers carried thereby. It will be noted that the rollers 32 are symmetrically placed at the sides of the plane of the eye 29 and axis of shaft 10. In the instance shown the lines joining the axes of rollers 32 with the axis of shaft 10 form angles of thirty degrees with the plane of said axis and eye 29. That form of the depressor shown in the drawings consists of a piece of angle-iron 33, having its ends upturned, as at 34. The said depressor 33 is secured to one of the walls of the conduit, preferably that opposite the septums. Where it is desired that the vehicle shall be able to run either way on the same track, the centers of said depressors should be opposite the septums.

The operation of the parts is as follows: As the vehicle carrying the support 3 and its attached parts approaches a septum the forward roller 32 strikes an upturned end 34 of the depressor and runs first up and then down the same, the arm 4 moving downward the meanwhile. As the roller 32 passes from the vertical face of end 34 to the under horizontal face of the part 33 the arm 4 reaches its lowest position. Dotted positions 4ª 4ᵇ of arm 4 in Fig. 5 illustrate the operation of the above parts at different times. As the roller 32 passes from under the depressor 33 the spring 27 restores the arm to its upper position, it being understood that depressor 33 is of a length sufficient to keep the arm 4 down until it cannot strike the septums as it rises. If the vehicles are to run in but one direction, the depressors need have but one upturned end, and that may be placed near the plane of the septums.

In some of the figures the diving-bells are shown as being under a flange of one of the rails and in others as being under a flange of a Z or three-quarter I bar or beam. The support 3 from the vehicle extends downward through a slot 36, formed by the adjacent edges of the flanges of the beam 35 and rail R or the two three-quarter I-bars 35 35ª.

Fig. 7 shows a cross-section of the railway, wherein one rail has a deeper web than the other, which rests on suitable chairs. The diving-bells in this case are placed under one of the flanges of the rail having the deeper web.

In order to prevent accumulations of dirt, snow, ice, &c., in the conduit, some or all of the cars or vehicles may be provided with brushes supported in any suitable way. I show a brush 37, borne by support 3, for sweeping the conduit, suitable catch basins or drains being provided to receive the matter so swept up.

I prefer that the diving-bells shall be ∩-shaped in cross-section and that the back walls, as z, shall extend downward and inward under the diving-bells and rest on the bottom of the conduit or flange of the rail or Z-bar. The part so resting may be fluted, or holes 38 38 may be cut in the lower part of the said back walls to allow any water getting behind the diving-bells to escape.

The diving-bells (shown in Figs. 5, 6, 7, and 8) may be made of sheet metal bent to form the sides and top, the ends flanged, as at 39, the end pieces, as 40, secured in place in an air-tight manner, the said ends having the rabbets below described, if desired, and the thimbles $t$ and the conductor E put in place; or the said diving-bells may be molded in one piece from wood pulp the flanges being formed at the same time and the ends being bored subsequently for the thimbles. The thimbles must make an air-tight joint with the partition and with the conductor.

In Figs. 14 and 15 I show the preferred form of the diving-bells and one way of connecting the sections of the conductor E. Each diving-bell is complete in itself, having at each end a half-cylindrical rabbet 41, extending part of the way downward from the top, and flanges for joining the diving-bells together. When the diving-bells are joined, a cylindrical hand-hole 41ª is formed by the rabbets above described, the walls $e$ of said rabbets rising above the tops of the bells, if desired, so that a flat top for the hand-holes may be secured, or the same may follow the curve of the top of the diving-bells. The sections of the conductor pass through the walls of the rabbets or hand-holes, being separated therefrom by the thimbles $t$. The ends of the sections of the conductor may be connected in any suitable way. In the drawings, particularly in Fig. 17, a soldered joint $j$ is shown, the joint being surrounded by a ferrule or covering 42 of insulating material. After the ends are joined the hand-hole should be filled with an insulating material $m$, as lead or paraffine, after which the cover 43 is put in place, being supported by lugs 44 or otherwise.

For the purpose of preventing water from getting to the contacts 23 24 from the ends of the central bore of the bearing 11 rings, as 57, of rubber or other material, fitted in grooves in said bearing 11 and pressing against the shaft 10, may be used, one on either side of the said plates or contacts 23 24.

When support 3 and the carrier are of conducting material, the bore or bearing-piece 11ᵃ may be enlarged, so that contact 23 will not touch the part 11ᵃ when turned from the position shown in Fig. 16, and thus possibly cause a short circuit in case two carriers are used, as above set forth, and the conduit is full of water. Such enlargement is indicated by the heavy line 59 in Fig. 13; or there may be a ring of insulation rabbeted into the shaft 10 at this place to prevent short-circuiting, said ring being opposite the contact 24 when shaft 10 is turned from normal position.

In Fig. 2 is shown a turn-out or branch and the method of leading the conductors by the same. The diving-bells are omitted between the septums marked Sᵃ and Sᵇ and Sᵃ and Sᶜ, the conductors E and E', after leading through the end walls Sᵇ Sᶜ, preferably being taken downward in any suitable way (and being suitably insulated) underneath the rails and Z or other bars. Conductors E and E' are shown as being joined, as at E². The conductor E, after such junction, is led along under the road-bed and then up to and through the septum or wall Sᵃ. The preferences 36 36ᵃ indicate the slots of a main and a branch conduit. If desired, the point or plate Q, lying between the branches of the slot, may be pivoted in the manner and for the purposes usual in cable street-railways.

In Fig. 3 is shown a crossing which does not differ much in construction from the crossing shown and described. The reference E³ marks the conductor of the cross-road and the references Sᵈ Sᵉ Sᶠ Sᵍ mark end walls of the diving-bells. The conductors E and E³ are not joined in this figure, though they may be so if desired. The depressors 33 near the crossings and turn-outs may extend up to the intersecting conduit at each side thereof, as in Fig. 18.

In Fig. 16 is shown a preferred form of the road-bed, conduit containing the diving-bells, and the position of the same relatively to the rails. In this figure the conduit is shown as being formed of two Z bars or beams 35 35ᵃ, placed reversely relatively to each other to form a box-shaped conduit having the slot 36 in the upper side midway of the grooves of the rails R R'. The Z-bars 35 35ᵃ may rest directly on the cross-ties, the space at and between their bottoms being filled or not, as desired, with a plate, or a plate may be placed under them on the ties. The last is the construction shown. The rails may be supported by suitable chairs, as shown. The upper flange of one of the Z beams or bars is of a width sufficient to house and protect the diving-bells. The depressors 33 may be located as hereinbefore described.

The diving-bells may be secured to their supports in any suitable way. I show for this purpose the bolts and nuts 80 81, which pass through the extended back walls z of the diving-bells and the web of the supporting rail or bar, and the T-headed bolts 82, the head being marked 83, which are riveted to one or both flanges 39 outside the diving-bells, the said bolts passing through the web of the support and having a nut 84 each to secure them in place.

For the purpose of insuring that the trolley-wheel 13 shall be returned to contact with the conductor E in the proper manner I may use inclined guides, as 89 90, one on either side of and extending below the conductor. In the case shown in Figs. 5, 6, 7, and 16 these guides are supported from the tops of the diving-bells by means of curved inverted troughs or arms held in place by screws. Suitable hangers 91, of insulating material, may be used to support the conductor E from the tops of the diving-bells or from the troughs above named or from the tops of the diving-bells. The guides may extend the entire length of the diving-bells or they may be used adjacent the septums only. For the purpose of giving the guides additional stiffness the space between them, their supports, and the tops of the diving-bells may be filled with cement. (See reference 92.)

A difficulty at times encountered in underground conduits for electric railways is the moisture which condenses on the inner surfaces thereof, leading to loss through leakage over the faces of even an insulating-surface. This deposition of moisture depends on well-known meteorological laws, fully set out in works on meteorology. Hence an extended explanation concerning those laws is not here necessary. A break in the continuity of the moisture on the surface of an insulating material will prevent the leakage above referred to. This may be attained by making the conduit or diving-bells of a good conductor of heat and coating it with an insulator, as paint, and having a layer of poor heat-conducting and therefore good insulating material to form part of the surface on which the condensation must take place. Following the laws of meteorology, this layer will be warmer than the walls of the conduit or diving-bells and will not receive any moisture even when the same is being deposited on the walls aforesaid. By a proper selection of materials it is possible to attain and maintain a difference in temperature in such cases as great as from 15° to 25° Fahrenheit, as set forth in works on meteorology.

In case the guides and their trough-shaped supports extend the entire length of the diving-bells, they may be coated with an insulating-paint, if of metal or other conductor themselves, and the space between them and the tops of the diving-bells be filled with an insulating composition which is a poorer conductor of heat than that on the guides and their supports. This will secure the break in the continuity of a deposit of moisture and prevent leakage, as above described. The diving-bells may be of metal in this case, as in all cases. I prefer, however, to arrange the guides 89 90 as shown in Figs. 8 and 15, in which the guides are integral with the curved troughs or canopies 93. The said canopies are shown as concentric with the conductor E. I prefer to make the canopies and the diving-bells of metal and to coat the first with an insulator. Said canopies may be hung from the tops of the diving-bells by means of hangers, as 95, of insulating material by preference, said hangers being secured in place by suitable means, as screws 94. The canopies may be supported at each end by the thimbles $t$, to which they may be secured by screws. As stated, the thimbles are of insulating (and non-heat conducting) material, as are the hangers 95.

The canopies are separated from the diving-bells by a space in which the air may freely circulate. By this arrangement it results that the canopies are always of the temperature of the air (or very nearly so) in the diving-bells, while the walls of the latter, being connected with the earth, may be much cooler than the air. In case the walls of the diving-bells have a temperature lower than the dew-point of the contained air, there will be a deposition of moisture on the inner surfaces of the diving-bells; but there will be none on the canopies, since the temperature of the latter will be about that of the air or above the dew-point of the same. The thimbles $t$ and hangers 95, being of non-heat-conducting material, will also be warmer than the diving-bell walls, and so will receive no moisture. In case it is desired to still further insure that there shall be no chance of a leak through the deposition of moisture on the thimbles $t$, there may be rings of non-heat-conducting material (see reference 96) placed thereon between the enlarged ends 97 thereof and the end walls of the diving-bells. These rings, which may be of water-proofed paper, will be of about the temperature of the air at all times and will not have moisture deposited on them. This will give a break in the continuity of any moisture that may be deposited on the thimbles. The hangers 95, if used, may have similar rings thereon.

When the diving-bells are made of metal or other material expansible by heat, the flanges of abutting diving-bells may be secured together by bolts and nuts or rivets of a length greater than the thickness of the two flanges, so as to have some play of the same, whereby contraction and expansion may freely take place; or modifications of expansion-joints common in steam-engineering practice may be used. The sections of the conductor in such cases may be sufficiently long to allow of a coil or so therein in the hand-holes, the same being suitably insulated.

In case the diving-bells are made of a material non-expansible by heat, the same may be secured to the supporting-webs of the rails or Z-beams near the middle of the length thereof. The rails or beams in such case should be securely fastened to the cross-ties at the same points.

In Fig. 4 is shown in diagram the connection from the conductor E to the motor. The support 3 and the carrier-arm 4 are as above described, while the conductor 14$^a$ leads from the support 3 along the truck to the motor, the brushes of which are marked 46 47 48 and the commutator 49. From the motor the current can be taken to the rail or rails or the beam 35 in any usual way.

The means for obtaining electrical connection between the sections 14 14$^a$ of the conductor leading to the motor (shown in Fig. 13) are especially intended for use when there are two or more carriers 4 with their supports 3 on each vehicle, the said supports being placed at such distances apart that all cannot be depressed at the same time, as above set forth. By this construction when one carrier is depressed into the conduit (possibly full of water) electrical connection between it and the motor is broken and all danger of short-circuiting is avoided. If but one carrier 4 is used, the contact-piece 23 may be a band extending around the shaft 10.

I have stated above that the material of which the support 3 and carrier 4 are made is not essential to my invention. It is essential that the conductor leading to the motor be insulated in whole or in part; but the manner in which said insulation is obtained is not essential. Thus it may be of the usual insulated wire or it may be within the support and arm and these be made of insulating material. Therefore when I use the term "insulated conductor" in the claims herein I intend only that the same shall not be limited to any particular method of insulating the conductor.

I do not limit myself to the precise form of my invention shown in the accompanying drawings and described above, since the same may be varied in many particulars and ways without departing from my invention.

I do not claim the method of securing underground conductors against contact with water, &c., by opposing the tendency thereof to rise by the resistance of air to compression; nor do I claim the combination of a diving-bell with an electric conductor passing therethrough *per se* as of the present invention.

This invention is limited to the case where a contact-piece has a reciprocating motion relatively to the vehicle or to the conductor in the diving-bells as distinguished from the case of contact-pieces having a rotary motion, the latter requiring that a fresh contact-piece shall contact with the conductor each time the vehicle passes a septum. I do not claim the latter construction as of this invention.

Having thus fully described my invention, what I claim, and desire to secure by Letters Patent, is—

1. In an electric railway, the combination of a diving-bell, an electric conductor passing therethrough, a contact-piece, an insulated conductor leading from said piece, and means for moving said piece reciprocatingly into and out of said diving-bell, substantially as described.

2. In an electric railway, the combination of a series of diving-bells, an electric conductor passing therethrough, a contact-piece for coaction with said conductor, an insulated conductor leading from said piece, and means for moving said contact-piece reciprocatingly into and out of said diving-bells, substantially as described.

3. In an electric railway, the combination of a series of diving-bells, an electric conductor passing through the same, a contact-piece, a movable carrier supporting the same, an insulated conductor leading from said piece, and means for moving said carrier reciprocatingly, whereby the contact-piece is moved into and out of the diving-bells, substantially as described.

4. In an electric railway, the combination of a series of diving-bells, an electric conductor passing therethrough, a contact-piece, a pivoted carrier supporting the same, an insulated conductor leading from said piece, and means for rocking said carrier, substantially as described.

5. In an electric railway, the combination of a series of diving-bells, an electric conductor passing through the same, a contact-piece, a movable carrier supporting the same, an insulated conductor leading from said piece, a spring for moving said carrier upwardly, and devices for moving the same downwardly, substantially as described.

6. In an electric railway, the combination of a series of diving-bells, an electric conductor passing therethrough, a contact-piece, a pivoted carrier supporting the same, an insulated conductor leading from said piece, a spring for moving said carrier upwardly, and mechanism for moving it downwardly, substantially as described.

7. In an electric railway, the combination of a series of diving-bells, an electric conductor passing therethrough, a contact-piece, a pivoted carrier supporting said piece, an insulated conductor leading from said piece, a spring for moving said carrier upwardly, an arm on said carrier, and a fixed depressor in the path of said arm adjacent the walls separating the diving-bells, whereby said carrier is oscillated and the contact-piece passes said separating walls, substantially as described.

8. In an electric railway, the combination of a series of diving-bells, an electric conductor passing through the same, a contact-piece, a pivoted carrier for said piece, an insulated conductor leading from said piece, arms on said carrier, a fixed depressor near the walls separating the diving-bells, and a spring for moving the said carrier upwardly, whereby said carrier is rocked and the contact-piece passes said walls, substantially as described.

9. In an electric railway, the combination of a series of diving-bells, an electric conductor passing therethrough, a contact-piece, a movable carrier supporting the same, an insulated conductor leading from said piece, inclined guides for centering said carrier as it returns to its upper position, and means for moving said carrier, substantially as described.

10. In an electric railway, the combination of a series of diving-bells, an electric conductor passing therethrough, a contact-piece, a pivoted carrier supporting the same, inclined guides for centering said carrier as it rises, and means for rocking said carrier, substantially as described.

11. In an electric railway, the combination of a series of diving-bells, an electric conductor passing therethrough, a support depending from a car, a carrier pivotally connected with said support, a contact-piece carried by said carrier for coaction with said conductor, a two-section insulated conductor leading from said piece to the motor, and means for rocking said carrier, whereby contact between the two sections of the conductor is broken when the carrier is rocked from its upper position, substantially as described.

12. In an electric railway, the combination of a series of diving-bells, an electric conductor passing through the same, a support depending from a car and having a hollow bearing, a carrier journaled in said bearing, a contact-piece supported by said carrier, a two-section insulated conductor leading to the motor from said piece, and means for rocking said carrier, whereby contact between said two sections is broken when the carrier is rocked from its upper position, substantially as described.

13. In an electric railway, the combination of a series of diving-bells, an electric conductor passing therethrough, a support depending from a car and having an insulated contact-piece thereon, an insulated conductor connected to said piece, a contact-carrier pivoted to said support and having a trolley and an insulated contact-piece for coaction with the first-named contact-piece when in normal position, and means for rocking said carrier, whereby said pieces are separated, substantially as described.

14. In an electric railway, the combination of a series of diving-bells, an electric conductor passing therethrough, a support depending from a car and having a hollow bearing, an insulated contact-piece within the said bearing, an insulated conductor connected with said piece, a contact-carrier journaled in said bearing and having an insulated contact-piece normally in contact with said first-named piece, an insulated conductor on said carrier connected with the contact-piece thereon, and means for rocking said carrier, whereby said contact is broken, substantially as described.

15. In an electric railway, the combination of a diving-bell, an electric conductor passing through the same, thimbles insulating the conductor from the bell, and an insulated canopy supported within the diving-bell and supporting the conductor and being separated from the bell and the conductor by an air-space, substantially as described.

16. In an electric railway, the combination of a number of diving-bells having abutting walls, rabbets in said abutting walls forming hand-holes, an electric conductor in each diving-bell passing through the walls of the rabbets and insulated therefrom, means for joining said conductors within the hand-holes, and insulating material surrounding said joint, substantially as described.

17. In an electric railway, the combination of a support having a hollow bearing, an electric conductor leading through the wall of said bearing, a contact-carrier comprising an arm and a shaft, the latter journaled in the said bearing, means controlling said carrier, and an electric conductor within said shaft and arm having one end connected with a contact-piece and the other extending out to the surface of the shaft in contact with the conductor on the bearing, substantially as described.

18. In an electric railway, the combination of a support having a hollow bearing, an electric conductor passing through the wall of said bearing, a shaft journaled therein having a central and radial bores, a contact-carrier arm secured to said shaft at one end and having a fork at the other and having a central forked hole, a trolley-wheel pivoted in said forks, a conductor leading from said wheel through the arm and shaft to and in contact with the conductor on the support or bearing, suitable insulation, and means controlling said shaft and arm, substantially as described.

19. In an electric railway, the combination of a support having a hollow bearing, an electric conductor leading through the wall of said bearing, a shaft journaled in said bearing and having a central and radial bores, a contact-carrier arm having an eye fitting said shaft and having a U-shaped groove in one side extending into the eye, a piece fitting in said U-groove, but not filling the same to the bottom, means securing the same in place, an electric conductor in the hollow of the arm and the bores of the shaft and contacting with the conductor on the support, and means for controlling the arm and shaft, substantially as described.

In testimony that I claim the foregoing as my invention I have signed my name, in presof two witnesses, this 7th day of March, 1892.

RICHARD W. BARKLEY.

Witnesses:
F. GOODWIN,
PAUL WILCOX.